United States Patent [19]

Stockner et al.

[11] 4,193,950
[45] * Mar. 18, 1980

[54] APPARATUS FOR INTRODUCING GAS INTO A LIQUID

[75] Inventors: Josef Stockner, Baierbrunn; Alfred Wildmoser, Munich, both of Fed. Rep. of Germany

[73] Assignee: Linde Aktiengesellschaft, Wiesbaden, Fed. Rep. of Germany

[*] Notice: The portion of the term of this patent subsequent to Sep. 26, 1995, has been disclaimed.

[21] Appl. No.: 895,641

[22] Filed: Apr. 12, 1978

Related U.S. Application Data

[63] Continuation-in-part of Ser. No. 702,052, Jul. 2, 1976, Pat. No. 4,117,048.

[30] Foreign Application Priority Data

Jul. 4, 1975 [DE] Fed. Rep. of Germany ....... 2530050

[51] Int. Cl.² .................. C02B 1/34; C02B 3/08; C02C 5/04
[52] U.S. Cl. .................. 261/87; 210/221 P; 261/93

[58] Field of Search .......... 261/93, 87, 83, 84, 261/DIG. 75; 210/221 R, 221 P, 219, 220

[56] References Cited

U.S. PATENT DOCUMENTS

| | | | |
|---|---|---|---|
| 2,121,458 | 6/1938 | Vogelbusch | 261/87 |
| 2,144,385 | 1/1939 | Nordell | 261/122 |
| 2,221,346 | 11/1940 | Durdin, Jr. | 261/122 |
| 2,324,018 | 7/1943 | Petersen | 261/93 |
| 2,973,095 | 2/1961 | Anderson et al. | 261/87 |
| 3,630,498 | 12/1971 | Bielinski | 261/87 |
| 4,117,048 | 9/1978 | Stockner et al. | 261/87 |

Primary Examiner—Frank W. Lutter
Assistant Examiner—Gregory N. Clements
Attorney, Agent, or Firm—Karl F. Ross

[57] ABSTRACT

An apparatus for introducing gas, e.g. atmospheric oxygen, into a liquid such as waste water or sewage comprises a plurality of ribs of airfoil cross-section and forming venturi nozzles which are first constricted and then widened in the direction of liquid flow. The ribs are formed with minute passages for introducing the gas into the liquid perpendicular to the direction of liquid flow across the ribs.

4 Claims, 8 Drawing Figures

APPARATUS FOR INTRODUCING GAS INTO A LIQUID

FIELD OF THE INVENTION

This application is a continuation-in-part of Ser. No. 702,052, filed July 2, 1976 now U.S. Pat. No. 4,117,048 issued Sept. 26, 1978.

The present invention relates to an apparatus or device for introducing a gas (preferably oxygen) into a liquid and, more particularly, to an apparatus for treating a liquid with the gas, e.g. to dissolve the gas or a component thereof into the liquid.

BACKGROUND OF THE INVENTION

Apparatus for treating a liquid with a gas can have many utilities and of particularly great interest at the present time are systems for dissolving oxygen in liquids such as waste water or sewage as part of a purification thereof.

Waste-water purification systems may involve the aerobic decomposition of organic components of waste water, e.g. in an activated sludge tank, with the result that a purified decantate can be removed free from toxic or noxious components. Of course, it is also interesting to introduce other gases, such as carbon dioxide, into water for various purposes, to dissolve ammonia in water and, in general to treat a liquid phase with gas phase.

A wide variety of techniques have been developed for this purpose, ranging from the simple injection of the gas into a stationary body of water through so-called aeration stones, spraying the liquid into the gas, rapidly mixing liquid in such a manner as to draw gas into it, etc.

A particularly advantageous approach has been described in the German published application (Offenlegungsschrift) DT-OS No. 2 223 460 in which the liquid is pumped through a multiplicity of passages into which capillary ribs open to introduce the gas. The result is a highly efficient gas diffusion system in which the liquid streams passing through the channels entrain the gas in the form of small bubbles. The bubble size depends upon the velocity of the liquid stream flowing across the lateral opening of the capillary into the flow passage because the bubble is formed by a shearing at this opening.

When such a system is used for waste waters and other contaminant-containing liquid streams, the flow passages are readily blocked or obstructed and the necessary high velocities cannot be obtained.

Thus, while the system is highly efficient if satisfactory liquid velocities and flow rates can simultaneously be attained, it has not been found to be practical for many applications.

OBJECTS OF THE INVENTION

It is the principal object of the present invention to provide an apparatus for the mixing of a gas with a liquid which is economical to operate with respect to energy losses or consumption, is more effective than prior-art devices of the aforedescribed type and provides a highly efficient combination of the gas with the liquid.

Another object of the invention is to provide a system for the purposes described which is less prone to blocking or obstruction than the earlier systems, which is particularly suited for the treatment of waste water, and which is free from other disadvantages characterizing gas-dispersing systems in finely divided form in a liquid phase.

It is also an object of the invention to extend the principles set forth in our application Ser. No. 702,052 mentioned above.

SUMMARY OF THE INVENTION

These objects and others which will become apparent hereinafter are attained, in accordance with the present invention, by providing a plurality of gas-distribution ribs with aerodynamic or airfoil profiles across which the liquid flows and which are provided along a surface of the aerodynamic or streamlined ribs with passage-forming means for feeding the gas into the liquid generally transversely to its flow direction. Advantageously, the profiles of adjacent ribs define between them venturi nozzles.

The term "venturi nozzle" is here used to define a passage which initially (in the direction of flow of the liquid) converges relatively sharply to a minimum spacing and thereafter widens more slowly. Preferably the gas-discharging means is disposed immediately upstream of this last divergence.

A gap between the ribs shaped as a venturi nozzle in the manner described, with the gas-discharging means disposed ahead of the divergence, permits the liquid to suck the gas from the gas outlet passages and shear the gas at high velocity in the constriction from the gas flow in the form of especially fine bubbles. The gas is sucked by the liquid from the passages by the venturi effect.

The gas-discharge means can be a perforated plate or a porous body, e.g. an aeration stone made of any convenient material, e.g. sintered particles of metal, ceramic or synthetic resin, which is preferably disposed on an upper or lower surface of the rib. The ribs can be oriented horizontally.

According to a feature of the invention, the ribs are connected with a source of gas, e.g. oxygen or atmospheric air, whose oxygen is to be dissolved in waste water, by pipes feeding the group of ribs, the ribs being hollow to distribute the gas to the several gas-permeable members forming the discharge means. Alternatively, the ribs can communicate with a common chamber supply wih the gas or may be provided with a manifold which feeds the gas to them.

The bubbles sheared by the high-velocity liquid in the narrowest part of each constriction are entrained by the liquid flowing between the ribs and are thereafter dispersed in the remaining body of liquid. Because of the relatively low volume of each bubble, the bubbles rapidly dissolve. The divergence at the end of the flow passage between each pair of ribs acts as a diffuser in which velocity is transformed again into pressure after pressure has been transformed into an increased velocity in the narrowest part of the constriction thereby minimizing the total energy consumption of the device.

The displacement of the liquid can be effected by a submerged pump adapted to drive tne liquid through the gaps between the ribs of the gas distributer. In this case, it is advantageous to provide the gas distributor in the form of a grid of such ribs of the outlet of a nozzle or duct traversed by the liquid and having the submerged pump at the intake end.

Of course, nozzles can be provided to inject the carrier liquid into the gap between the ribs so that the displacement of the larger body of liquid is effected in accordance with ejector principles.

According to another feature of the invention, the ribs are formed as annular or ring-shaped members, e.g. as horizontal annular hollow discs, at the end of a vertical pipe and are spaced along the axis thereof to provide radial venturi gaps. The entire assembly can be received in a sewage clarification tank and a pump can be provided to circulate water axially downwardly through the duct and radially outwardly through the annular ribs.

According to the invention we can make use of a propeller pump and a radial pump whose rotor is disposed within the space surrounded by the annular ribs can also be employed. Thus the water circulation device can be used to circulate the contents of the tank as well as aerate the latter.

The pump motor can be disposed above the liquid level, the shaft of the pump extending vertically into the assembly as described.

According to another aspect of the invention, a pump rotor or impeller can be formed from a plurality of radial pump wheels which can alternate with annular ribs of the type described and furthermore the annular ribs and the radial pump wheels can be rotatable counter to one another, i.e. in opposite senses. Alternatively the annular ribs can be rotated while the radial members are stationary and act as flow deflectors.

Such an arrangement not only permits a more effective circulation of liquid downwardly and outwardly through the unit within the clarifier vessel but also increases the relative velocity between the liquid and the ribs, thereby increasing the shearing effect and reducing the diameter of the gas bubbles which are formed. One or more ribs in any of the embodiments described can be provided with one or more vibrators to increase the relative velocity of the liquid and the ribs. The brief accelerations imparted by the vibrator to the ribs has been found to produce especially small bubbles and permits the flow velocity of the liquid to be reduced without detrimentally affecting the overall efficiency of the device.

Especially high relative velocities are obtained when one or more ribs are provided as multiblade propellers cooperating with fixed ribs. The ribs can also be the liquid displacing vanes of a radial pump.

The invention is not only applicable to dissolution of gases in liquids but may be used in addition for the separation of liquids and solid particles by flotation, i.e. systems in which gas bubbles are generated to adhere to solid particles.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
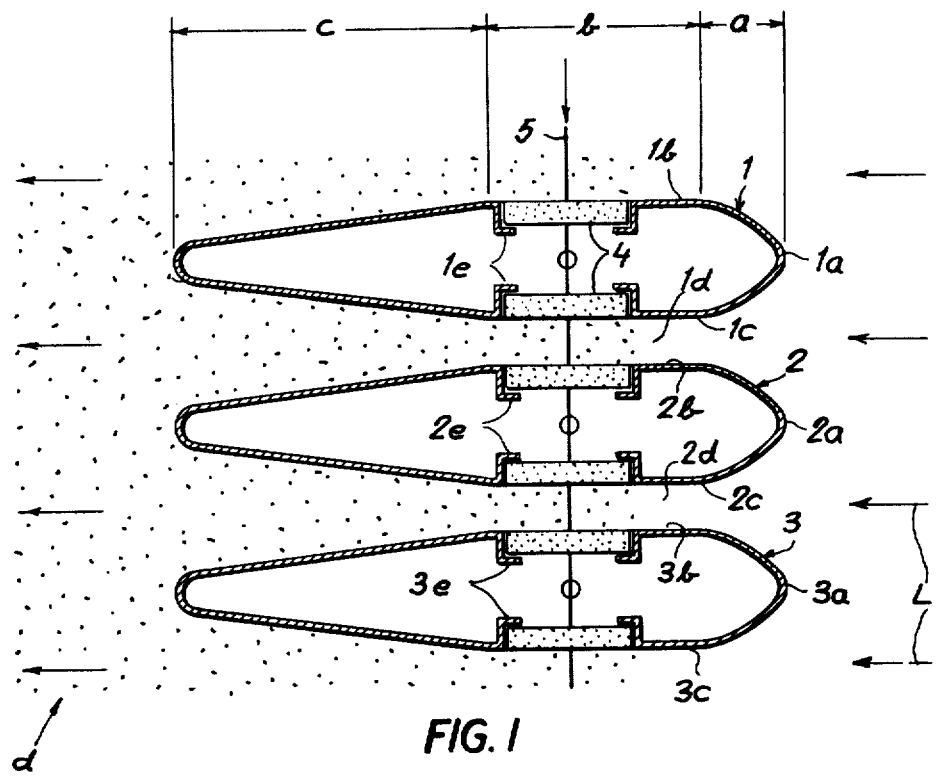
FIG. 1 is a vertical section through a plurality of horizontally disposed ribs, drawn to an enlarged scale and illustrating diagrammatically the principles of the present invention.
Figure 2:
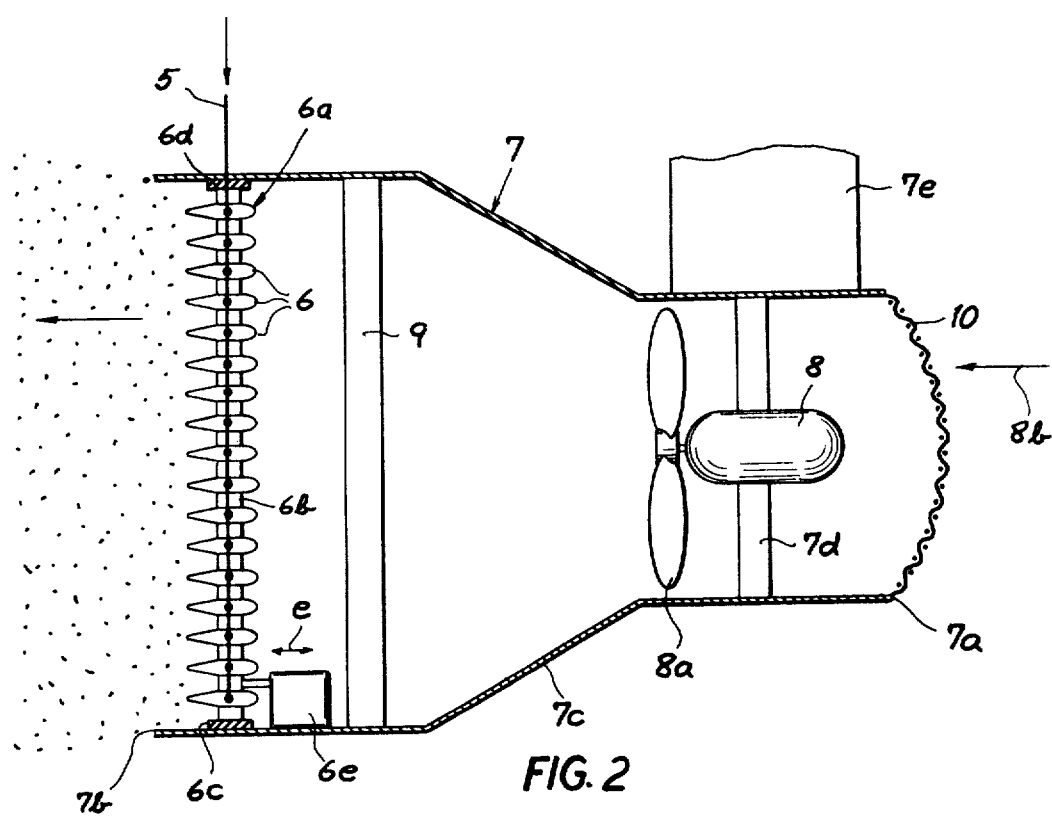
FIG. 2 is an axial cross section through an apparatus according to the present invention, also diagrammatically represented.

FIG. 1 shows three ribs in schematic cross section forming a grid of a gas-dispersing device, e.g. of the type shown in FIG. 2. The ribs 1, 2 and 3 are of aerodynamic profile and thus each has a streamlined or rounded upstream end as represented at 1a, 2a, 3a against which the oncoming stream of liquid represented by the arrow L impinges.

The upper and lower surface 1b and 1c, 2b and 2c, 3b and 3c define a pair of flow passages represented generally at 1d and 2d respectively, Each of these passages initially converges in a zone a, remains constant over a zone b and diverges over a zone c, the divergence of zone c being less rigid than the convergence in the zone a. The zone b represents the maximum constriction of the flow passages 1d and 2d. The flow passages 1d and 2d thus constitute venturi nozzles which tend to draw gas into the liquid from the passages in a block 4 disposed along the upper and lower surfaces of each rib substantially over a major portion of the width of the zone b. The blocks 4 are composed of sintered metals, ceramic or synthetic resin and are permeable to gas so as to effectively have a multiplicity of capillary passages from which the gas can be sucked by the venturi effect. Because of the constricting nature of the venturi nozzle, the liquid has a maximum flow velocity in the zone b.

The upper and lower walls of each rib 1, 2, 3 is provided with seats 1e, 2e and 4e in which the gas permeable member 4 is received.

As the gas is torn from the passages of its permeable block 4, it is entrained with a liquid phase and dispersed into surrounding liquid at the downstream side d of the device. Gas is supplied to the ribs via a line represented diagrammatically at 5. It will be apparent that the ribs extend horizontally so that the venturi nozzles are generally flat and horizontal and are not readily obstructed by contaminants contained in the waste water or sewage.

FIG. 2 illustrates a gas-dispersal device particularly adapted to enriching waste water or sewage with oxygen or for treating natural water, e.g. drinking water with oxygen by aeration. In this embodiment a multiplicity of ribs 6, generally similar to the ribs 1-3 and operating in accordance with the same principles, form a grid work 6a at the downstream side of duct 7 which has intake 7a and an outlet 7b. Between the small-cross section intake 7a and the large-cross section outlet 7b, the duct 7 diverges as represented at 7c.

A submersible pump 8 is mounted coaxially via strut 7d in the intake 7a which is provided with a large-mesh grid 10 of a basket shape to prevent entry of objects which may interfere with the pumping operation. The pump 8 has a propeller-type impeller 8a which drives the liquid in the direction of arrow 8b.

Downstream of the pump 8, 8a but upstream of the grid 6a, the duct 7 is provided with guide plates 9 to reduce turbulence and maintain approximately laminar flow of the liquid through the grid 6a. The latter is mounted by a vertical rib 6b upon the duct 7 and can be supplied with oxygen via the line 5 previously described. The vertical rib 6b can be mounted elastically at 6c and 6d upon the wall of the duct 7 and can be connected to a vibrator 6e to produce oscillations of the ribs transverse to the direction of liquid flow as represented by the arrow e. The ribs 6 disperse the gas into the liquid as the latter flows in the direction of arrow 8b through the device in the manner described in FIG. 1.

The assembly of FIG. 2 can be carried on a support, represented diagrammatically at 7e enabling it to be rotated about a vertical axis or entrained in a circular path about a vertical axis in the clarifier tank in which it is disposed for aerating the sewage.

Figure 3:
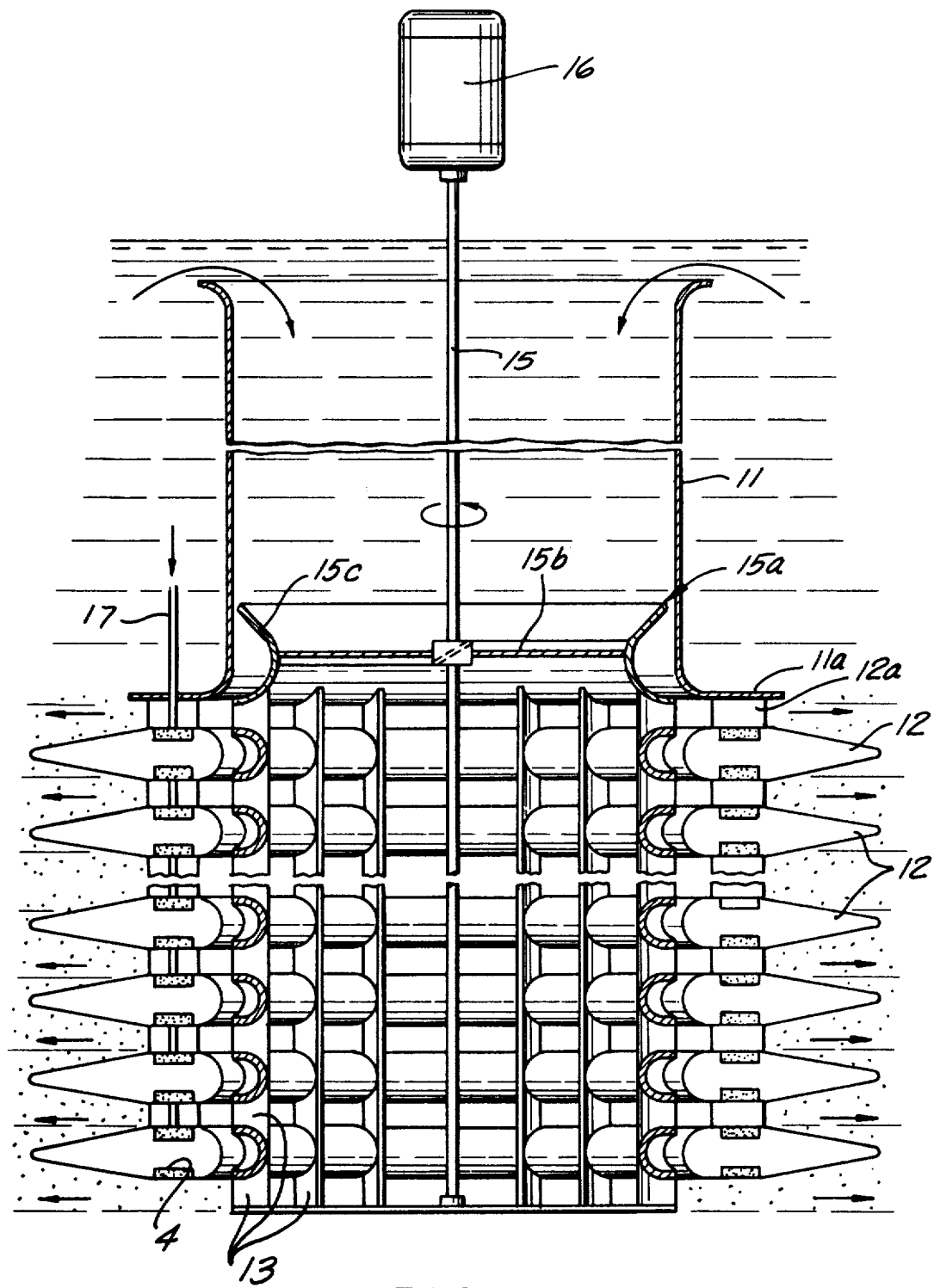
FIG. 3 is a vertical axial cross-sectional view through a gas-dispersing device for a waste water treatment plant.

FIG. 3 shows, in diagrammatic cross section, another embodiment of the invention in which a vertically extending duct 11 is submerged in a clarifier tank and is provided with a plurality of vertically spaced horizontal annular ribs 12 as described for the ribs 1 through 3 previously. The ribs 12 are supported on vertical struts 12a suspended from an outwardly extending flange 11a of the duct 11. A pipe 17, connected to an oxygen source, communicates with all of the ribs and interconnects them to enable them to disperse in the liquid. The ribs are formed with the gas-permeable bodies 4 mentioned previously and define radially extending venturi gaps in the manner also described above.

A motor 16 has a shaft 15 carrying a rotor 15a which is formed with a plurality of angularly spaced struts 15b attaching a downwardly converging shell 15c to this shaft 15. On this shell 15c there are a multiplicity of vertical vanes 13 which form a radial pump forcing the liquid outwardly between the ribs 12. The liquid is drawn downwardly over the top of the duct 11 as shown by the arrows in FIG. 3. This arrangement operates in the manner described with respect to FIG. 2 except that the flow of liquid is radial with respect to the pump rather than axial.

Figure 4:
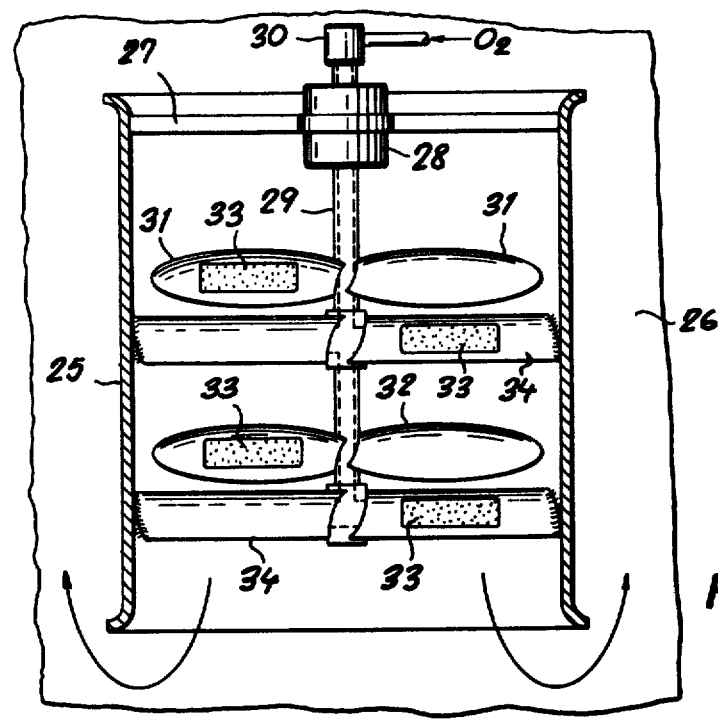
FIG. 4 is a section similar to FIG. 3 through another device for this purpose, also according to the invention.

In FIG. 4 we have shown an arrangement in which a vertical duct 25 is disposed within the clarifier tank 26 and is open at its upper and lower ends therein. The upper end carries, via ribs 27, a motor 28 whose shaft 29 is hollow and transmits oxygen from a distributor 30 to a plurality of multiblade propellers 31 and 32 of aerodynamic configuration and provided on their upper and lower surfaces with porous members 33 each shown at 4 in FIG. 1.

The propeller blades are hollow and disperse the gas in the liquid as previously described. The blades cooperate with fixed vanes 34, also of aerodynamic profile, and supplied with gas from the shaft 29 via lateral openings therein. As each blade sweeps over a respective vane, the liquid is displaced generally through duct 25 as shown by the arrows.

Figure 6:
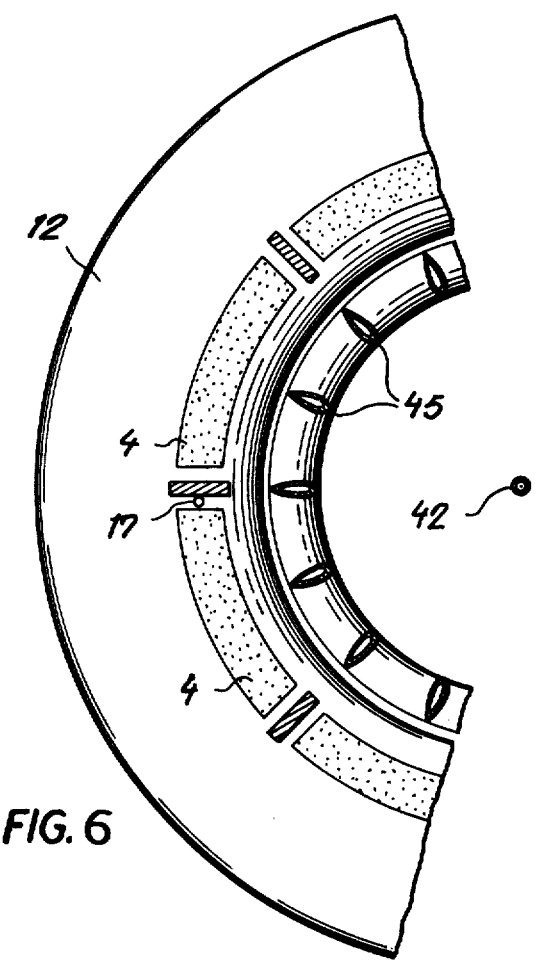
FIG. 6 is a section taken along the line VI—VI of FIG. 5.
Figure 7:
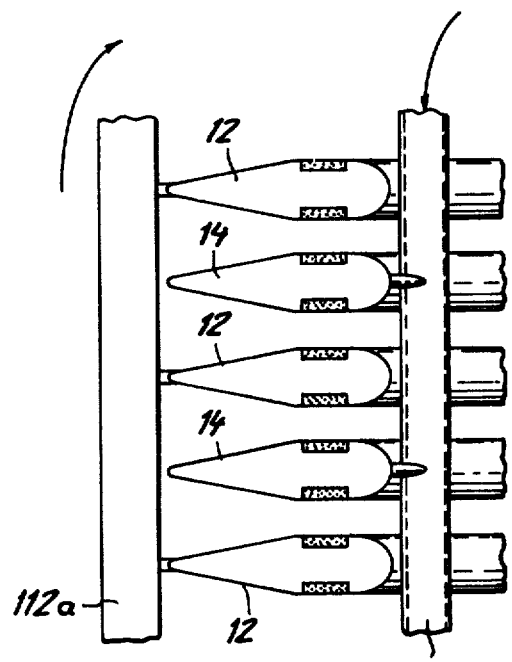
FIG. 7 is a vertical section through another embodiment.
Figure 5:
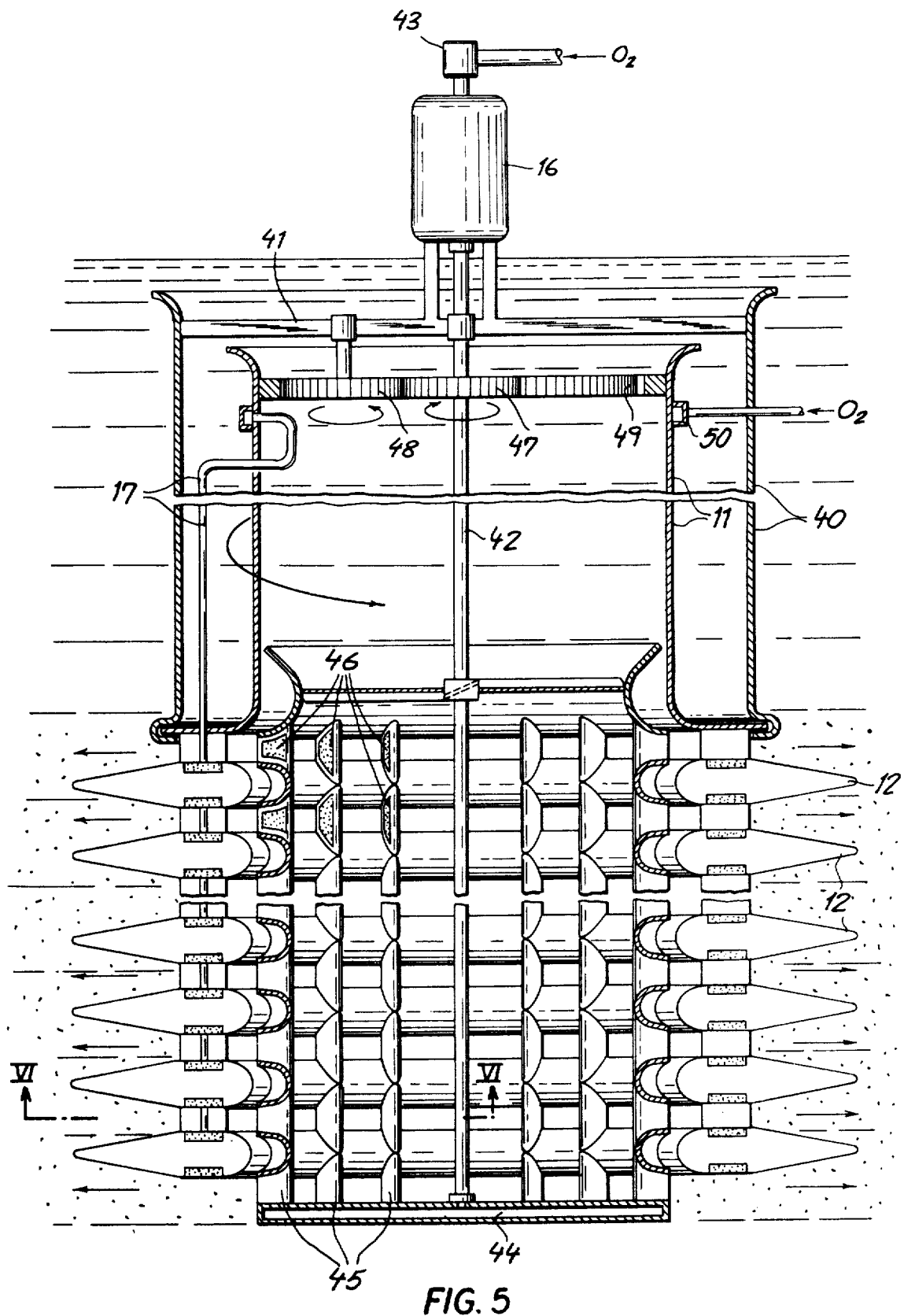
FIG. 5 is a view similar to FIG. 3 but illustrating another embodiment of the invention.

FIGS. 5 and 6 show an embodiment in which the ribs 12 are connected to the shell 11 which is here rotatably mounted on an outer sleeve 40 into which the liquid passes through its upper end submerged in the clarifier tank. The motor 16 is mounted on struts 41 of the sleeve 40 and has hollow shaft 42 communicating with an oxygen distributor 43 and opening into a chamber 44 formed at the bottom of the rotor. The chamber 44 communicates with aerodynamically shaped vertical members 45 which function as radial vanes to displace the liquid outwardly, and in addition are formed with gas-permeable bodies 46, corresponding to the bodies 4 described in connection with FIG. 1. The aerodynamically shaped vanes 45 diverge radially outwardly as can be seen from FIG. 6. The shaft 42 can carry a gear 47 which meshes with a gear 48 on the strut 41, the latter, in turn, meshing with a ring gear 49 on the interior of the duct 11. Consequently, the duct 11 and the ribs 12 are rotated in the sense opposite the sense of rotation of members 45. The latter may carry horizontal ribs as shown in FIG. 7, the latter being interfitted alternatingly with the ribs 12. The duct 11 is provided with a distributor 50 supplied with oxygen and communicating, e.g. a tube 17, with the ribs 12. Thus oxygen is fed into the gas by both sets of counterrotating ribs. The horizontal ribs of the inner rotor of the system of FIG. 7 is represented at 14. The ribs 14 are received between the ribs 12 and, to allow these ribs to clear one another during their rotations, the vanes 113 and 112a of the counter-rotating rotors are set off to opposite sides of the ribs 12 and 14.

Figure 8:
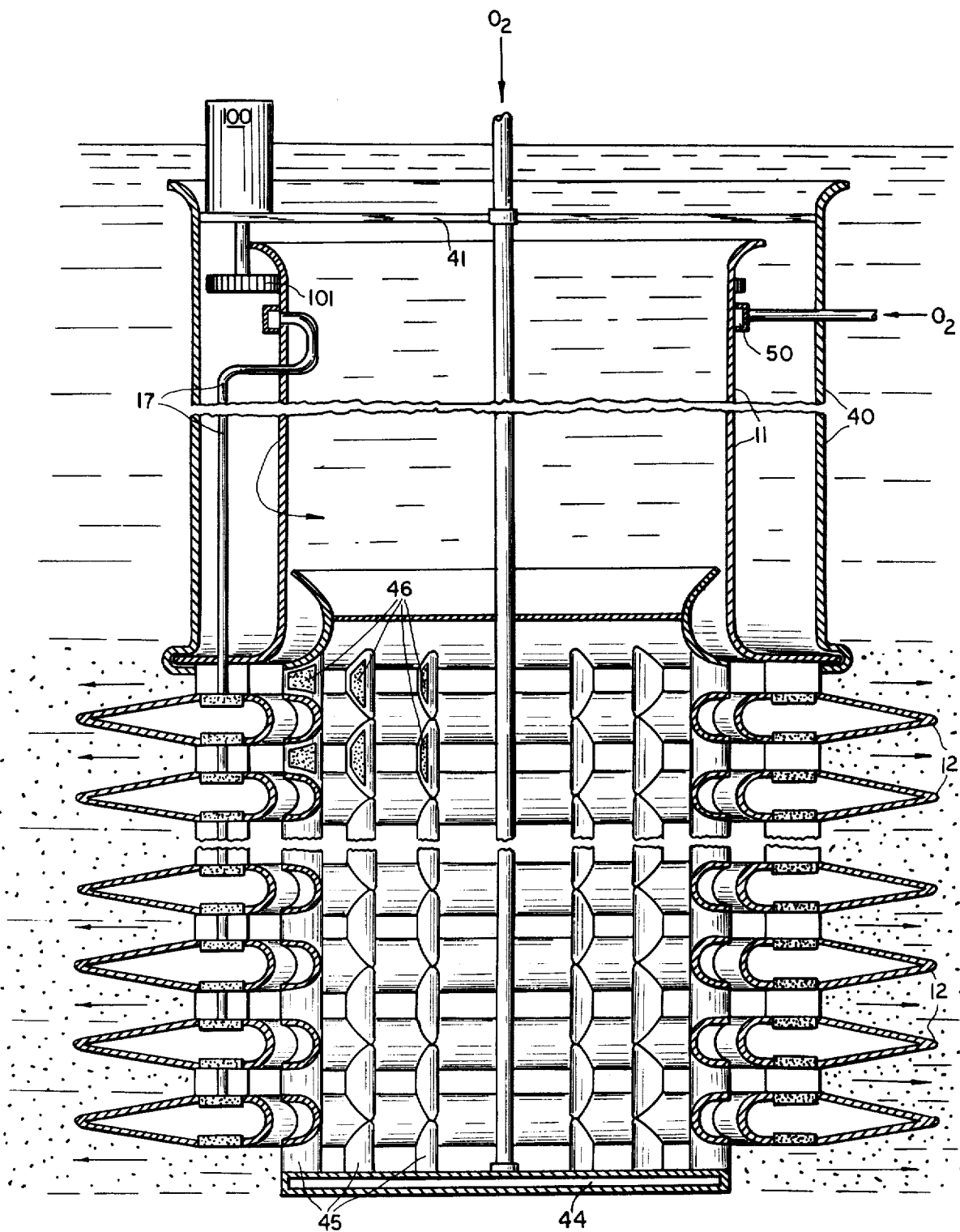
FIG. 8 is a section similar to FIG. 5 showing a modification of that embodiment.

In the embodiment of FIG. 8, the vanes 45 are held stationary and serve as deflecting members while the ribs 12 are rotated by a motor 100 and gearing 101 which drive the duct 11.

We claim:

1. A device for dispersing gas in a liquid in the aeration of swage in a clarifier tank, comprising:

a plurality of aerodynamically spaced ribs defining between them venturi passages;

means for inducing a flow of liquid through said passages, said passages progressively converging from an upstream side to a constricted portion, thereafter diverging to a downstream side of the respective passage;

gas permeable means along at least one surface of each of said ribs bounding a respective one of said passages in the region of the respective constriction for feeding gas to the liquid in a direction substantially perpendicular to the direction of liquid flow through the respective passage;

a vertical duct open at its upper end and formed at its lower end with said ribs, said ribs being axially spaced horizontal rings, said means for inducing liquid flow through said passages including an axial intake, radial outflow pump having a rotor coaxial with said rings for dispacing liquid between them, said rotor being formed with aerodynamically shaped members which function as radial vanes; and means for holding said vanes stationary while rotating said ribs.

2. A device defined in claim 1 wherein said aerodynamically shaped members are hollow and formed with gas-permeable surfaces, said members being connected with gas supplying means.

3. A device for dispersing gas in a liquid in the aeration of sewage in a clarifier tank, comprising:

a plurality of aerodynamically spaced ribs defining between them venturi passages;

means for inducing a flow of liquid through said passages, said passages progressively converging from an upstream side to a constricted portion, thereafter diverging to a downstream side of the respective passage;

gas-permeable means along at least one surface of each of said ribs bounding a respective one of said passages in the region of the respective constriction for feeding gas to the liquid in a direction substantially perpendicular to the direction of liquid flow through the respective passage;

a vertical duct open at its upper end and formed at its lower end with said ribs, said ribs being axially spaced horizontal rings, said means for inducing liquid flow through said passages including an axial intake, radial outflow pump having a rotor coaxial with said rings for displacing liquid between them, said rotor being formed with aerodynamically shaped members which function as radial vanes; and means for rotating said rotor and said ribs counter to one another in opposite senses.

4. A device defined in claim 3 wherein said aerodynamically shaped members are hollow and formed with gas-permeable surfaces, said members being connected with gas supplying means.

* * * * *